United States Patent [19]

Mitomi et al.

[11] Patent Number: 5,371,836
[45] Date of Patent: Dec. 6, 1994

[54] POSITION TEACHING METHOD AND CONTROL APPARATUS FOR ROBOT

[75] Inventors: Takashi Mitomi, Higashiosaka; Takafumi Tetsuya, Amagasaki; Katsuyoshi Satoh, Suita, all of Japan

[73] Assignee: Matsushita Electric Industrial Co., Ltd., Kadoma, Japan

[21] Appl. No.: 476,426
[22] PCT Filed: Aug. 22, 1989
[86] PCT No.: PCT/JP89/00850
§ 371 Date: Jun. 14, 1990
§ 102(e) Date: Jun. 14, 1990
[87] PCT Pub. No.: WO90/02029
PCT Pub. Date: Aug. 3, 1990

[30] Foreign Application Priority Data

Aug. 24, 1988 [JP] Japan .................. 63-210304

[51] Int. Cl.$^5$ .............. G05B 19/415; G06F 15/46
[52] U.S. Cl. .................... 395/80; 395/87; 901/31
[58] Field of Search .............. 364/513; 395/93, 92, 395/80, 87, 88, 82, 89, 127, 83; 219/124.34; 901/4, 31, 3, 10, 46

[56] References Cited

U.S. PATENT DOCUMENTS

| 3,943,343 | 3/1976 | Irie | 235/151.11 |
|---|---|---|---|
| 4,025,838 | 5/1977 | Watanabe | 318/568 |
| 4,146,924 | 3/1979 | Birk et al. | 395/82 |
| 4,385,358 | 5/1983 | Ito et al. | 364/513 |
| 4,484,120 | 11/1984 | Olex et al. | 395/99 |
| 4,503,507 | 3/1985 | Takeda et al. | 395/83 |
| 4,528,632 | 7/1985 | Nio et al. | 395/87 |
| 4,541,060 | 9/1985 | Kogawa | 395/87 |
| 4,550,383 | 10/1985 | Sugimoto | 364/513 |
| 4,558,424 | 12/1985 | Oguchi et al. | |
| 4,602,345 | 6/1986 | Yokoyama | 364/513 |
| 4,626,756 | 12/1986 | Inaba et al. | 318/573 |
| 4,689,756 | 8/1987 | Koyama et al. | 395/87 |
| 4,706,204 | 11/1987 | Hattori | 395/87 |
| 4,712,183 | 12/1987 | Shiroshita et al. | 364/513 |
| 4,743,819 | 5/1988 | Hashizume | 318/368 |
| 4,803,640 | 2/1989 | Mitomi et al. | 364/513 |
| 4,821,207 | 4/1989 | Ming et al. | 364/513 |
| 4,831,316 | 5/1989 | Ishiguro et al. | 395/89 |
| 4,831,549 | 5/1989 | Red et al. | |
| 4,833,624 | 5/1989 | Kuwahara et al. | |
| 4,835,710 | 5/1989 | Schnelle et al. | 364/513 |
| 4,835,730 | 5/1989 | Shimano et al. | |
| 4,837,734 | 6/1989 | Ichikawa et al. | 901/4 |
| 4,922,434 | 5/1990 | Fule | 395/87 |
| 4,935,597 | 6/1990 | Zimmer | 219/124.34 |
| 4,967,125 | 10/1990 | Hara | 395/87 |
| 4,987,527 | 1/1991 | Hamada | 395/127 |
| 5,006,999 | 4/1991 | Kuno | 395/88 |

FOREIGN PATENT DOCUMENTS

| 0114362 | 8/1984 | European Pat. Off. | B25J 9/00 |
|---|---|---|---|
| 0172486 | 2/1986 | European Pat. Off. | |
| 2145708 | 2/1973 | France | |
| 235218 | 4/1986 | Germany | B25J 9/18 |
| 55-99605 | 7/1980 | Japan | G05B 19/18 |
| 58-22686 | 2/1983 | Japan | |
| 60-205720 | 10/1985 | Japan | |
| 60-205721 | 10/1985 | Japan | |
| 61-248106 | 11/1986 | Japan | |
| 61-250705 | 11/1986 | Japan | |
| 62-93710 | 4/1987 | Japan | G05B 19/42 |
| 2027938 | 2/1980 | United Kingdom | |

OTHER PUBLICATIONS

Perez, Rafael A. & Koutsourelis, Dimitrous, 'A Command Language for Multiple Robot Arm Coordination', IEEE Transactions on Education, vol. E-30, No. 2, 1987, New York, USA pp. 109–112.

Primary Examiner—Allen R. MacDonald
Assistant Examiner—George Davis
Attorney, Agent, or Firm—Cushman Darby & Cushman

[57] ABSTRACT

The present invention, by manually operating a robot and memorizing a position of the extremity of the robot, teaches a reference point representing a representative position and orientation on a moving path and a relative position of an operating position of a robot extremity in operation from the above-mentioned reference point, and designate a path of a moving position of the robot extremity in operation by an array of the reference points, and teachings of the moving path and a gripping position can be separated each other, and an accurate and easy teaching is enabled.

14 Claims, 15 Drawing Sheets

POSITION TEACHING METHOD AND CONTROL APPARATUS FOR ROBOT

FIELD OF THE INVENTION

The present invention relates to an action teaching method and a control apparatus for an industrial robot. Particularly, the present invention relates a teaching method and control apparatus which facilitate teaching an operation by which plural robot-manipulators can keep a relative position with each other such as in actions where a workpiece is gripped and moved with plural robot manipulators.

BACKGROUND OF THE INVENTION

In cooperative operation of plural robots such that plural robot-manipulators grip a workpiece and move it, the plural robot manipulators need to be operated so as to maintain relative positions to each other. Hitherto, there have been methods for teaching such operations as described hereafter.

A first method is off-line teaching, wherein operating positions of the robot are inputted as data values into a computer and are set in teaching. However, this method becomes difficult, and subsequently unfavorable, as the accuracy of the operating positions of the robots with respect to their actual work is not necessarily superior.

A second method is to manually operate the robot to a moving position of an actual operation using a teaching box, and to teach the operating position of the robot by sensing and storing the position and orientation of the robot at that time. In this method, it is very difficult to teach each of the plural robots, by manual operation, a position and orientation which actually maintains a relative position, including orientation, of a terminal hand. Accordingly, this method has often been used by teaching only a starting position to plural robots performing a cooperative operation. Subsequent positions of one of the plural robots are then taught in regard to subsequent teaching positions in the cooperative operation. As such, the plural robots are operated in a manner so that an original relative position is maintained with respect to the operating path of the robot which is taught by the above-mentioned method. An example of this method is shown in FIG. 2. In this example, operating positions and orientations P1, P2, P3, P4 of a first robot manipulator, and an operating position and orientation Q1 of a second robot manipulator, corresponding to P1, are taught. Operating positions and orientations Q2, Q3, Q4 are then determined by calculation from a relative position of P1 and Q1 and P2, P3, P4, and operational paths of respective manipulators are interpolated. As the position is detected and memorized by manually operating the robot to an actual operating position, a teaching accuracy in this method is better. Yet, when the robot operation requires a gripping of a workpiece, complications arise. While a gripping position of a workpiece can be accurately taught, an accurate teaching of the movement of a workpiece by robot manipulators is not realized as all of the operating positions are directed at the robot manipulators.

Further, a detailed teaching of a gripping position of a workpiece can be difficult. In teaching an operating case where, based upon a gripping position of one robot manipulator, a large workpiece is gripped and moved with two robot manipulators, a slight difference in gripping orientation during the teaching operation can become a large positional difference at the other end of the work process. As demonstrated in FIG. 17, such a situation is liable to become a problem in the operation of the robot manipulator which grips the other end of the workpiece.

SUMMARY OF THE INVENTION

An object of the present invention is to provide an easy and accurate method of teaching a plurality of robot manipulators on the basis of a moving position of an actual workpiece and application of sensor feedback with respect to the workpiece position and orientation. A further objective of the present invention is to provide a robot manipulator control apparatus to apply this teaching method.

In order to resolve the current problems of typical robot teaching methods, a first embodiment of the present invention adopts a method where a reference point, which shows a representative position, orientation on a moving path, and relative position from the above-mentioned reference point of an operating position of a robot extremity in an operating state are taught by detecting and storing the position of the robot extremity by manually operating the robot. Then a path of the operating positions of the robot extremity while in a operating state is designated by an array of the reference points. In case where one workpiece is gripped and moved with plural robot manipulators, a specified point on the workpiece is regarded as a reference point, and the relative position of the above-mentioned reference point and the gripping position of each robot is taught, and moving or the work is designated by an array of the reference points.

Moreover, a control apparatus of the robot disclosed in a second embodiment comprises means for manually operating the robot, means for detecting and storing the present position and/or orientation of the robot extremity, means for calculating and storing a reference point from stored plural positions, means for calculating and storing a relative position and orientation of the robot extremity from one of the reference points, means for calculating an aimed position of operation of the robot on the basis of the stored reference points and designated relative position, and means for operating the robot in a manner to move on the reference points by interpolating between the present reference point and the subsequent reference point while keeping a relative position of the present reference point and the robot extremity after designation of the present reference point and the subsequent reference point.

Moreover, a control apparatus of the robot disclosed in a third embodiment of the present invention comprises means for manually operating the robot, means for detecting and storing the present position of the robot extremity and/or orientation, means for calculating and storing a relative position and orientation of the robot extremity from one of the reference points by using the stored position and/or orientation as the reference points, means for calculating aimed positions of operation of the robot on the basis of these after designation of stored reference points and the relative position, and means for operating the robot so as to move along the reference points by interpolating between the present reference point and the subsequent reference point while keeping a relative position of the present reference point and the robot extremity.

In the robot operation teaching method of the first embodiment of the present invention: when the work is moved, an actual position of the work can be taught with an accuracy provided by the robot since the reference point is taught by manually operating and storing the position of the robot extremity; and in teaching an operation which moves while gripping the workpiece, the moving path of the work and the teaching of gripping position can be separated from each other since the path of operating positions are appointed by the array of reference points by teaching a reference position from the reference points of the robot extremity in operation; and even in a case where the relation of the work and gripping position varies by sensor feedback or the like, coping of control of operation becomes easy.

In the robot control apparatus of the second embodiment of the present invention: position of point and gripping position on the basis of an actual moving position of the workpiece can be stored by means of manually operating the robot and storing the present position and orientation of the robot; the representative position of the moving path of the workpiece can be calculated from the positions of the plural points based on the moving position of the above-mentioned workpiece by means of calculating and storing the reference point from the stored plural positions; the relative position of the gripping position of the workpiece and the representative position of the moving path of the workpiece can be calculated by means of calculating and storing the relative position and orientation of the robot extremity from one of the reference points; the robot can be operated to grip the workpiece by appointing the reference point and relative position as the aimed position of operation of the robot; and the robot can be operated by teaching the moving path of the workpiece by moving the reference point by interpolating between the present reference point and a subsequent reference point while keeping the relative position of the present reference point and the robot extremity by appointing the present reference point and subsequent reference point.

The robot control apparatus of a third embodiment of the present invention acts in a manner similar to the control apparatus of the robot of the second embodiment with the exception that the stored position-orientation are directly used as reference points.

DESCRIPTION OF THE PREFERRED EMBODIMENTS

Hereafter, an action teaching method and a control apparatus of a robot of the present invention is elucidated using an embodiment.

Figure 3:
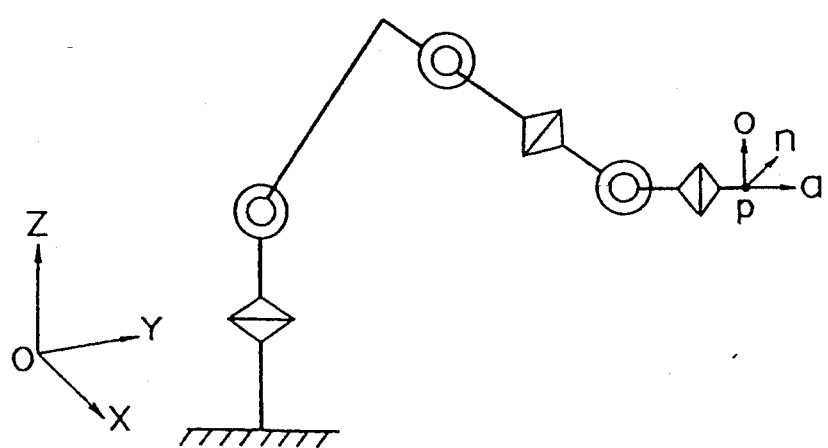
FIG. 3 is an explanatory diagram of an axes configuration of a robot manipulator in an embodiment of the present invention.
Figure 4:
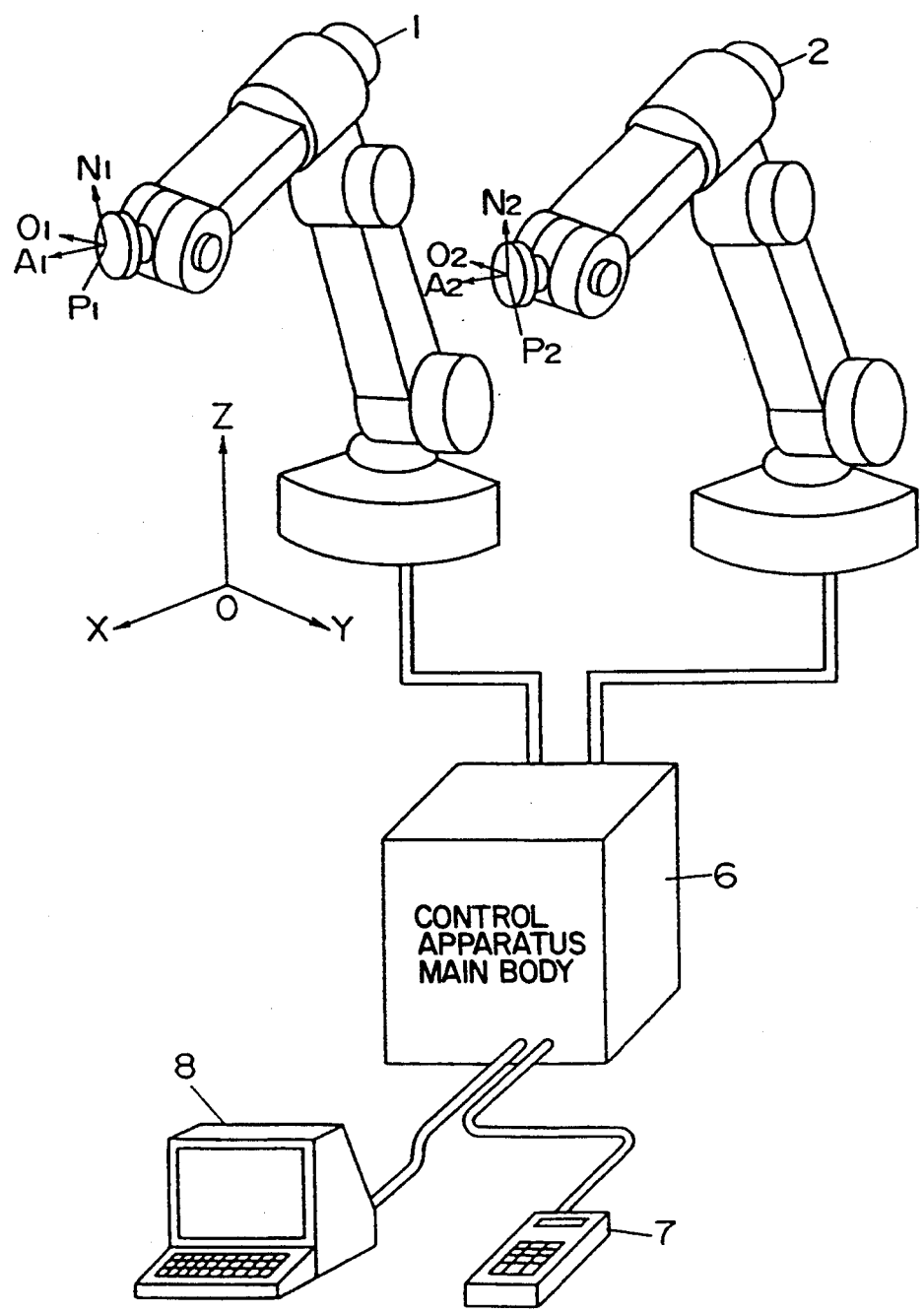
FIG. 4 is an explanatory diagram of a system configuration in the present embodiment.

The robot in the present embodiment is a robot manipulator having an axis configuration as shown in FIG.3. As shown in FIG.4, two of the above-mentioned robot manipulators are connected to the main body of the control apparatus 6 and are operated by a user from said control apparatus. Each robot manipulator is driven at six joints by motors, as shown by the axes configuration of FIG. 3, and can take an arbitrary hand position p and orientations (n, o, a) within a movable range, wherein p is a hand position vector in a coordinate system (O, X, Y, Z) which is fixed in the system of the present embodiment, and (n, o, a) are unit vectors which cross orthogonally with each other, representing an orientation of the hand in the above-mentioned coordinate system.

The control apparatus detects the present positions of the motors, namely the angles of the joints, by encoders which are mounted on the above-mentioned respective motors, and actions of respective robot manipulators are controlled by driving and feedback-controlling the above-mentioned respective motors.

Figure 5:
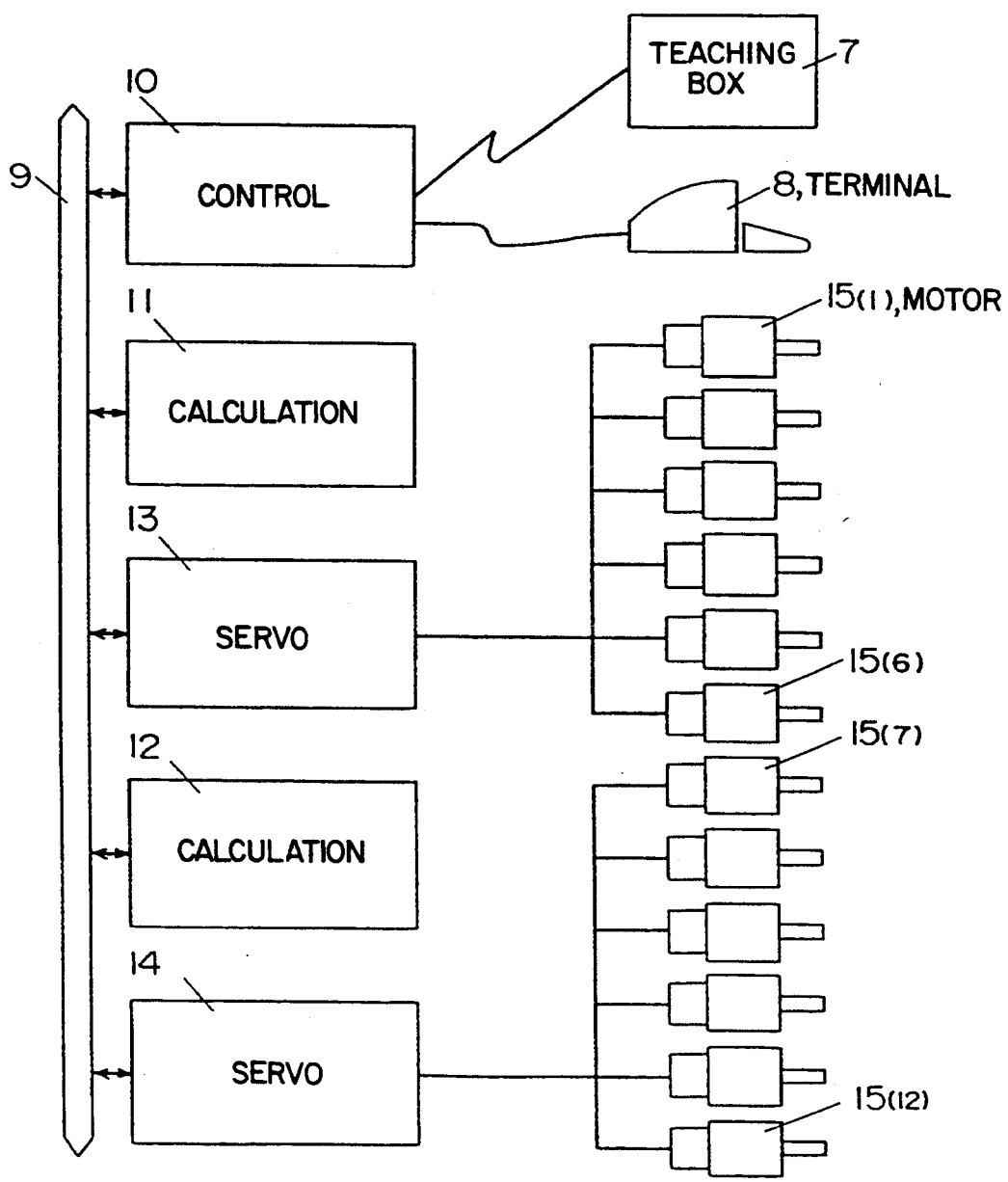
FIG. 5 is a configurational diagram of a hard ware of a control apparatus.
Figure 6:
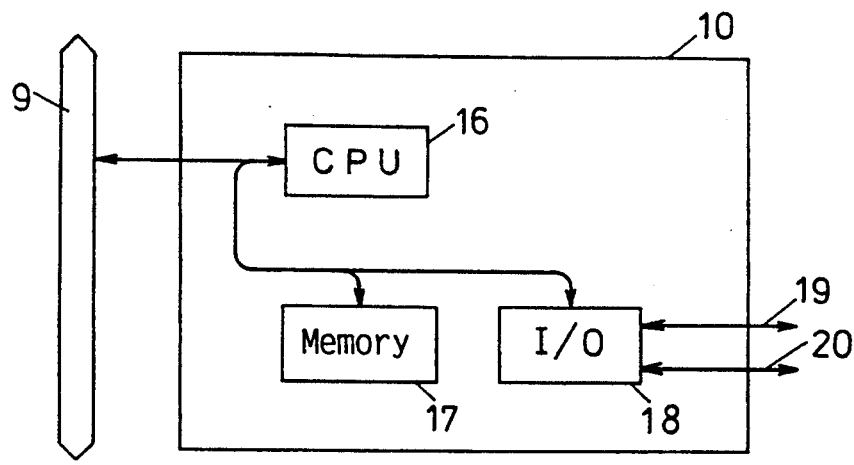
FIG. 6 is a configurational diagram of a central control unit.
Figure 7:
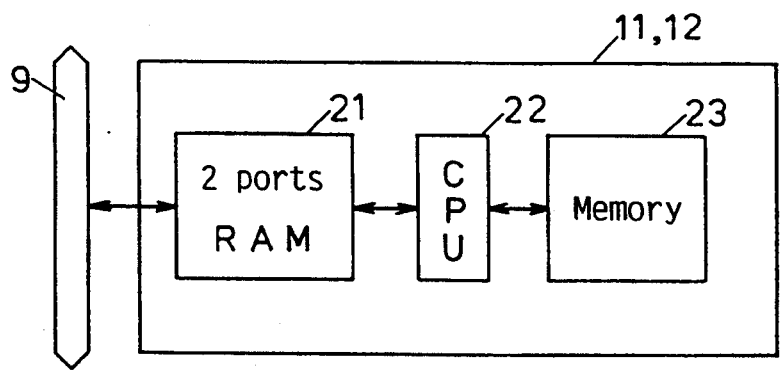
FIG. 7 is a configurational diagram of a calculation unit.
Figure 8:
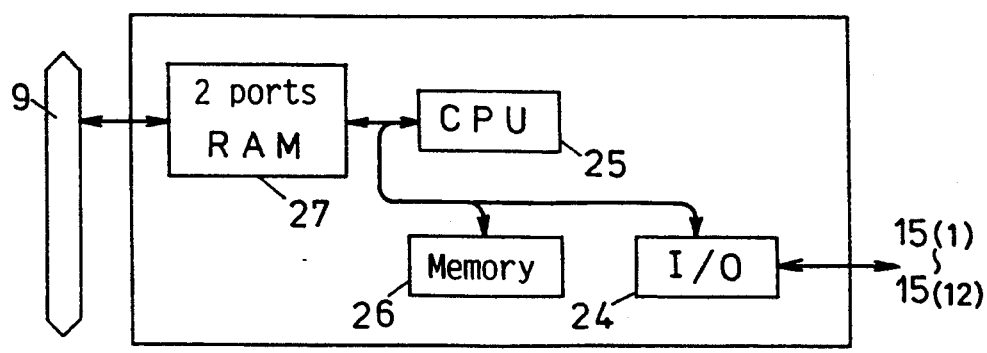
FIG. 8 is a configurational diagram of a servo control unit.

A configuration of the control apparatus is shown in FIG. 5. A central control unit 10 is composed of a microcomputer 16, a memory 17 and an I/O 18 as shown in FIG. 6, and the microcomputer 16 is operated by a program stored in the memory 17. A console terminal 8 and a teaching box 7 are connected to the I/0 18 by communication lines 19 and 20, and the microcomputer 16 of the central control unit 10 executes a suitable program in compliance with a signal which is inputted at the console terminal 8 by an operator of the system, thereby controlling the robot manipulator. The calculation units 11 and 12 are for controlling the respective corresponding robot manipulators, and as shown in FIG. 7, are composed of a microcomputer 22, memory 23 and a dual port RAM 21, which is capable of read-write from the central control unit 10 through a bus 9. Motors 15(1) thru 15(12), on which encoders for detecting the present positions are mounted, are connected to servo control units 13 and 14. Servo control units 13 and 14, as shown in FIG. 8, are composed of an I/O 24, including a PWM circuit for controlling the above-mentioned motors 15(1) thru 15(12), a microcomputer 25, a memory 26 and a dual port RAM 27, which is capable of read and write from the calculation units 11 and 12 through a bus 9.

In operating the robot manipulator, the central control unit 10 transmits commands of action of the robot manipulator to the calculation units 11 and 12 by writing a command of action and coordinates ($n_i$, $o_i$, $a_i$, $p_i$) ($i = 1, 2$) of the aimed position and position and orientation of the extremity of the robot manipulator. These commands originate from the central control unit 10 and proceed to the dual port RAM 21 of the calculation units 11 and 12. The calculation units 11 and 12 calculate so-called reverse conversion from the aimed position and orientation ($n_i$, $o_i$, $a_i$, $p_i$) of the hand in compliance with operational commands from the central control unit 10, calculate an angle of each joint of the robot manipulator, and performs action-commands to the servo control units 13 and 14 by writing a command of operation, including the aimed value of each motor, to the dual port RAM 27 of the servo control units 13 and 14 by taking an aimed value of a revolution angle of the motor corresponding to a required joint angle. The servo control units 13 and 14 control actions of the motors 15(1) thru 15(12) in compliance with the present position of the motors obtained from the encoders mounted on each motor 15(1) thru 15(12) along with the aimed value written in the dual port RAM 27 from the calculation units 11 and 12 responding to the action-command from the calculation unit 11 and 12. As mentioned above, position and orientation of the hand of the robot manipulator can be operated to a desired position by action-command from the central control unit 10.

Figure 9:
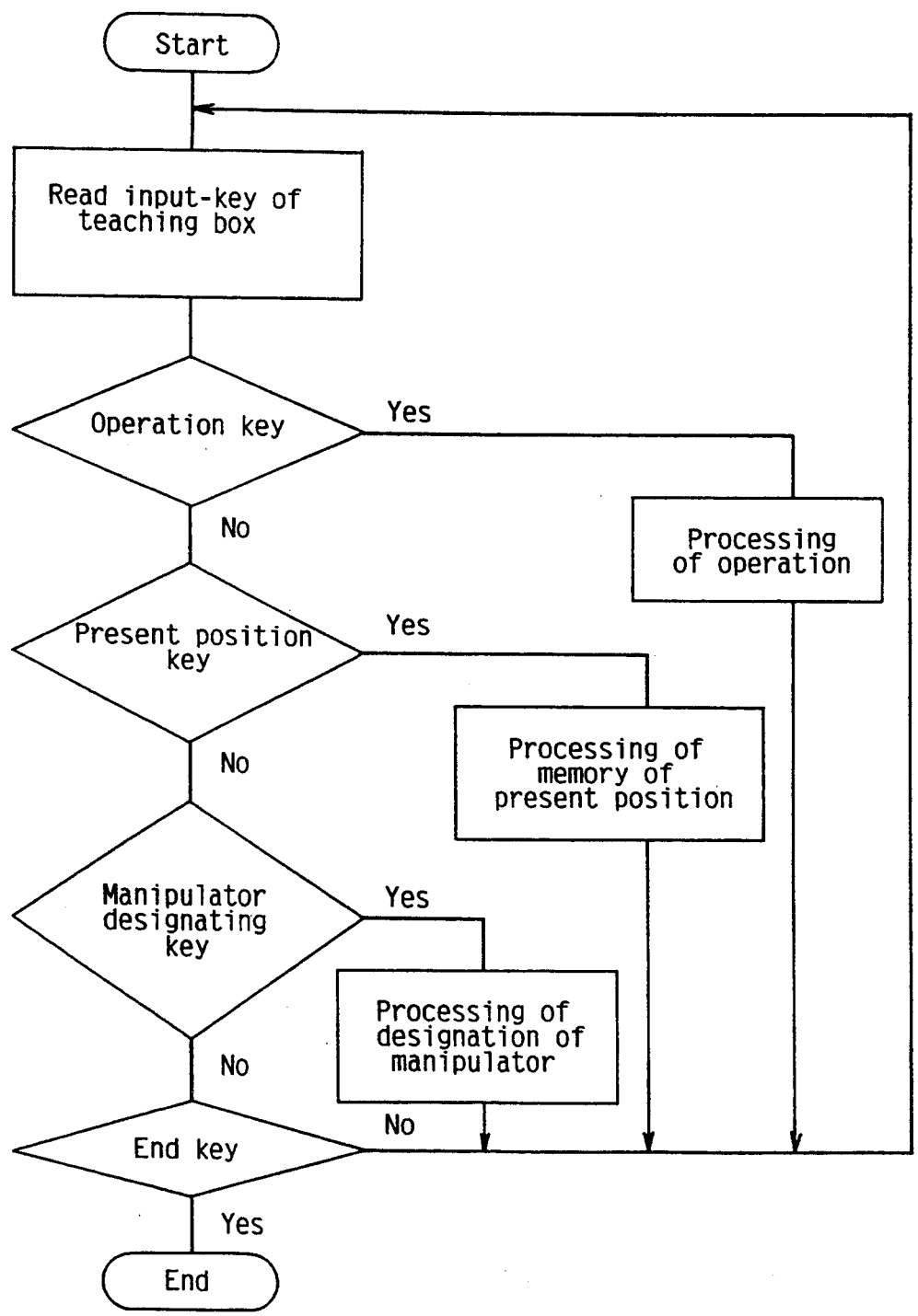
FIG. 9 is a flow chart of a process concerning processing of a teaching box.

Subsequently, the control apparatus of the second and third embodiment is elucidated. Means for manually operating the robot is realized by the teaching box 7 and a program in the microcomputer 16 of the central control unit 10. The teaching box 7 has the microcomputer in the same body, and has a plurality of keys and communicating function as an input means for an operator at the control apparatus. Namely, while the operator is pushing the key, the microcomputer in the teaching box 7 transmits a code, corresponding to the pushed key, to the central control unit 10 of the control apparatus. The central control unit 10 performs an action-command to the robot manipulator by a program in compliance with the code transmitted from the teaching box 7. The program is started by an input from the console terminal 8, and terminates by a terminating key input of the teaching box 7. A flow of the processing is shown in FIG. 9.

Means for detecting and storing the present position of the robot extremity is realized as follows. The command for detecting the present position is sent to the calculation units 11 and 12 from the central control unit 10 via the dual port RAM 21, and the calculation units 11 and 12 send commands of the detected present position to the servo control units 13 and 14 responding thereto. The servo control units 13, 14 read out counters on the encoders mounted on respective motors 15(1) thru 15(12), and an angle of revolution of respective motors 15(1) thru 15(12) are written in the dual port RAM 27 as replies to the calculation units 11 and 12. The calculation units 11 and 12 read out the revolution angle of each motor from the dual port RAM 27, and calculate the revolution angle of each joint, and furthermore perform so-called transformations, where then the positions and orientations (n, o, a, p) of the extremities of the robot manipulators are calculated from each joint angle, and positions and orientations data of the extremities are written in the dual port RAM 21 as a reply to the central control unit 10. The central control unit 10 reads out the data of the position and orientation of the extremity from the dual port RAM 21, and stores it in the memory 17 of the central control unit 10 with a name corresponding to the data of the position and orientation of the extremity. The name, which is inputted from the console terminal 8 by the operator, is read in the central control unit 10. The mean for detecting and storing the present position is started by operation of the teaching box 7 as a process for storing the present position of FIG. 9.

Data of the position and orientation of the extremity is composed of three unit vectors (n, o, a), which are orthogonally crossed and represent the orientation, and a vector p, representing the position. Furthermore, the reference point data has the same configuration. Therefore, data of the position and orientation of the extremity, which is stored by means for detecting and storing the present position such as in the control apparatus of the third embodiment is usable itself as a reference point.

Subsequently, means for calculating and storing a reference point from the stored plural positions is elucidated. The above-mentioned means in the present embodiment is realized as a program of the central control unit 10, of which there are two kinds, one for calculating a reference point from three positions, and the other for calculating a reference point from two positions; with both started by input from the console terminal 8.

Figure 10:
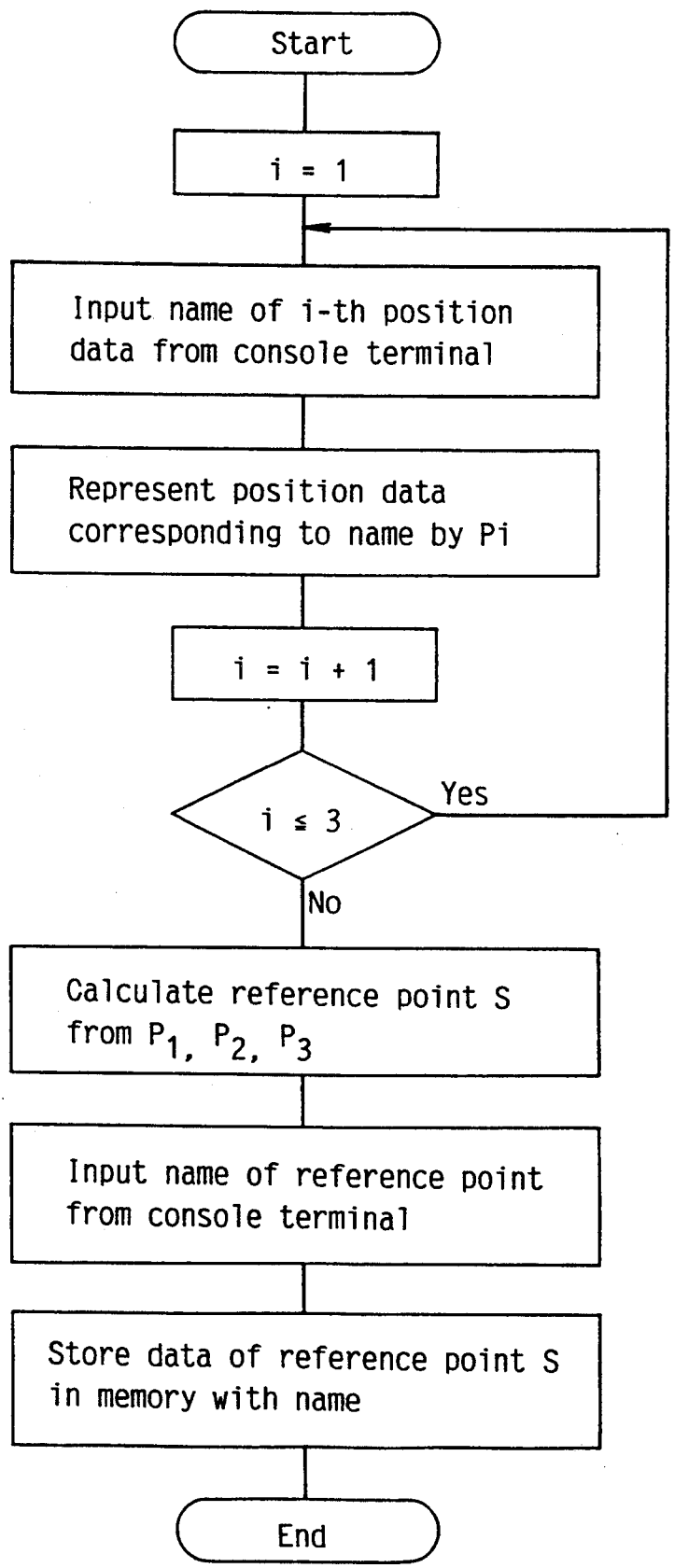
FIG. 10 is a flow chart of a process for calculating and storing a reference point from three positions.
Figure 11:
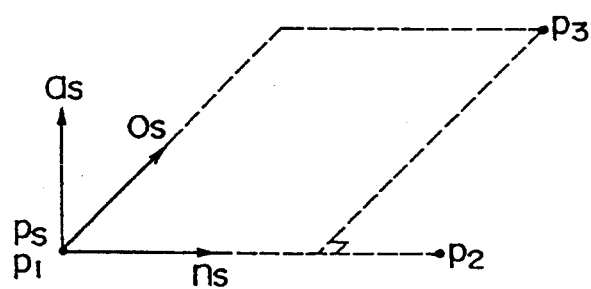
FIG. 11 is an explanatory diagram of relation of the three positions and the reference point.

A process flow chart for calculating and storing the reference point from three positions is shown in FIG. 10. Calculation of the reference point $S = (n_s, o_s, a_s, p_s)$ is performed by the following calculation:

$p_s = p_1$
$n_s = (p_2 - p_1)/|p_2 - p_1|$
$w_1 = p_3 - p_1$
$w_2 = w_1 - (w_1 \cdot n_s)n_s$
$o_s = w_2/|w_2|$
$a_s = n_s \times o_s$ Wherein, $p_s$ is identical with $p_1$ as shown in FIG. 11, and $n_s$ is a unit vector directing from $p_1$ to $p_2$, $o_s$ is a unit vector of a direction of a perpendicular which is down from $p_3$ by a straight line connecting between $p_2$ and $p_3$, and $a_s$ is an outer product of $n_s$ and $o_s$.

Figure 12:
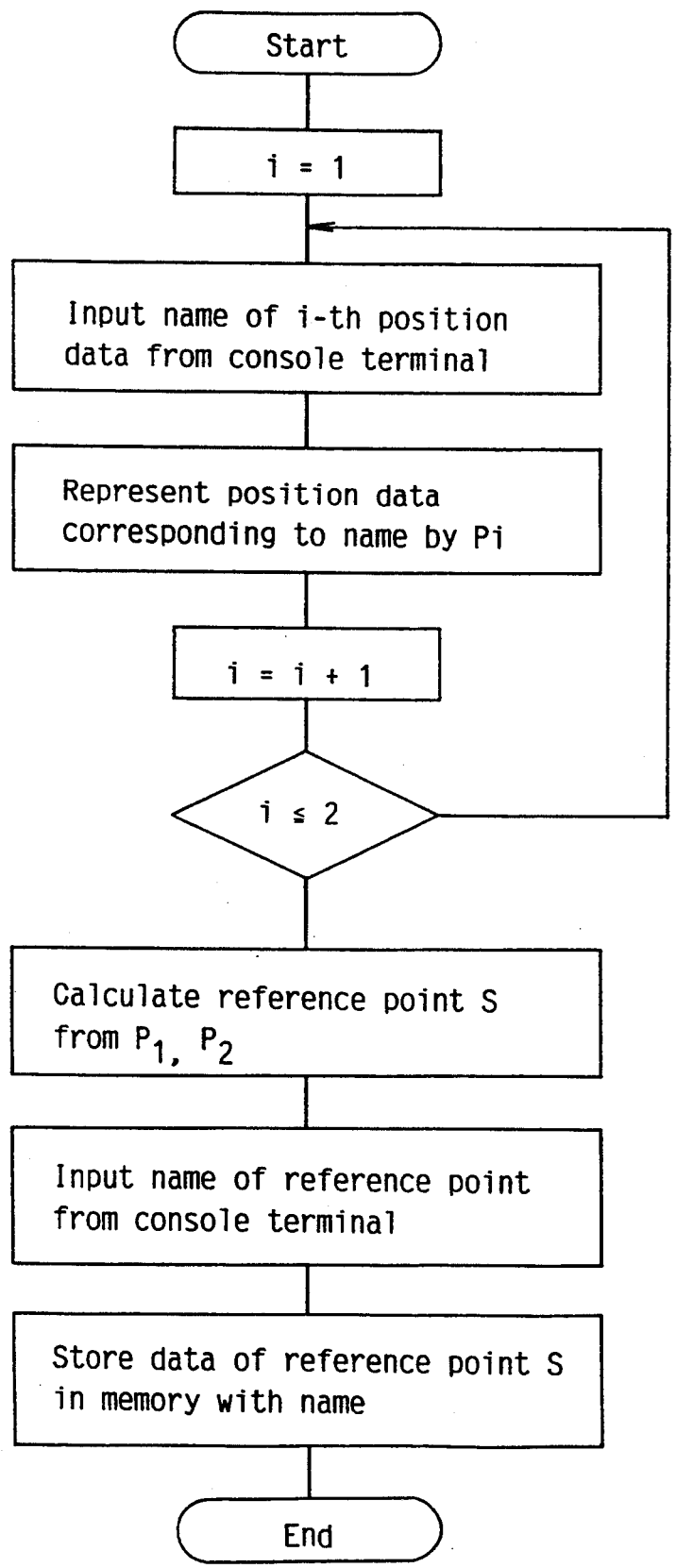
FIG. 12 is a flow chart of a process for calculating and storing a reference point from two positions.
Figure 13:
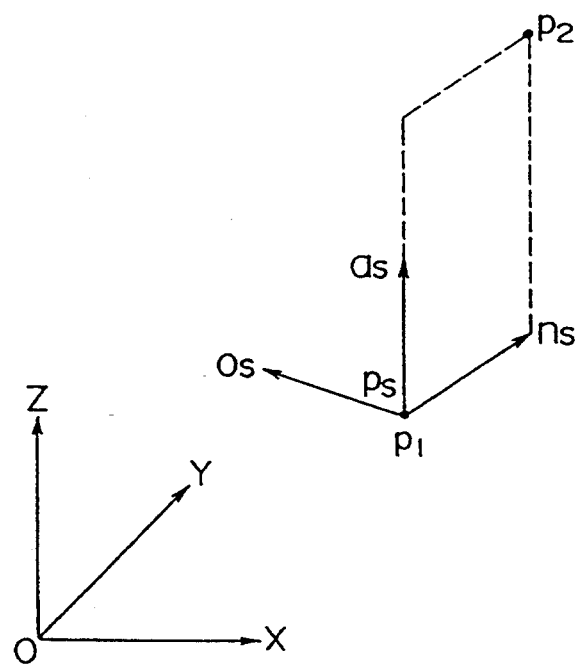
FIG. 13 is an explanatory diagram of a relation of the two positions and the reference point.

A process flow chart for calculating and storing a reference point from two positions is shown in FIG. 12. Calculation of the reference point $S = (n_s, o_s, a_s, p_s)$ is performed by the following calculation:

$a_s = (0, 0, 1)^T$
$P_s = P_1$
$w_1 = p_2 - p_1$
$w_2 = w_1 - (w_1 \cdot a_s)a_s$
$n_s = w_2/|w_2|$
$o_s = a_s \times n_s$ Wherein, as shown in FIG. 13, $p_s$ is identical with $p_1$, and $a_s$ is the unit vector of Z direction in a world coordinate system, and $n_s$ is a perpendicular unit vector which is down from $p_2$ by the straight line extending from $p_s$ to $a_s$, and $o_s$ is an outer product of $a_s$ and $n_s$.

Figure 14:
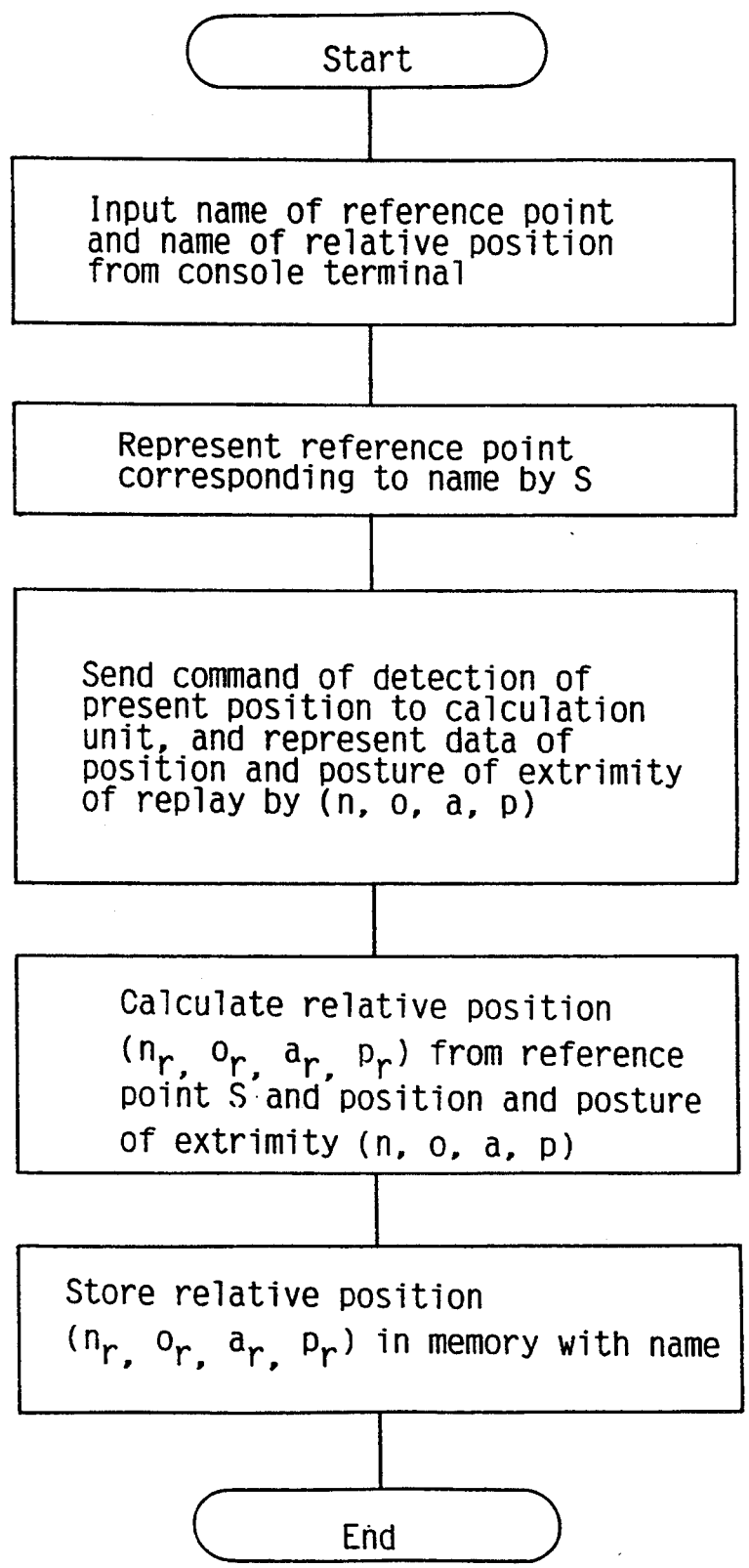
FIG. 14 is a flow chart of a process for calculating and storing a relative position.

Means for calculating and storing a relative position and orientation of the extremity of the robot from one of the reference points is realized by a program of the central control unit 10 which performs the following calculation and stores the result in the memory 17. A flow chart of this process is shown in FIG. 14.

$$S = \begin{pmatrix} n_s & o_s & a_s & p_s \\ 0 & 0 & 0 & 1 \end{pmatrix} \quad (4 \times 4) \text{ matrix}$$

$$P = \begin{pmatrix} n & o & a & p \\ 0 & 0 & 0 & 1 \end{pmatrix} \quad (4 \times 4) \text{ matrix,}$$

then, a relative position ($n_r$, $o_r$, $a_r$, $p_r$) is calculated as:

$$\begin{pmatrix} n_r & o_r & a_r & p_r \\ 0 & 0 & 0 & 1 \end{pmatrix} = S^{-1} \cdot P.$$

Figure 15:
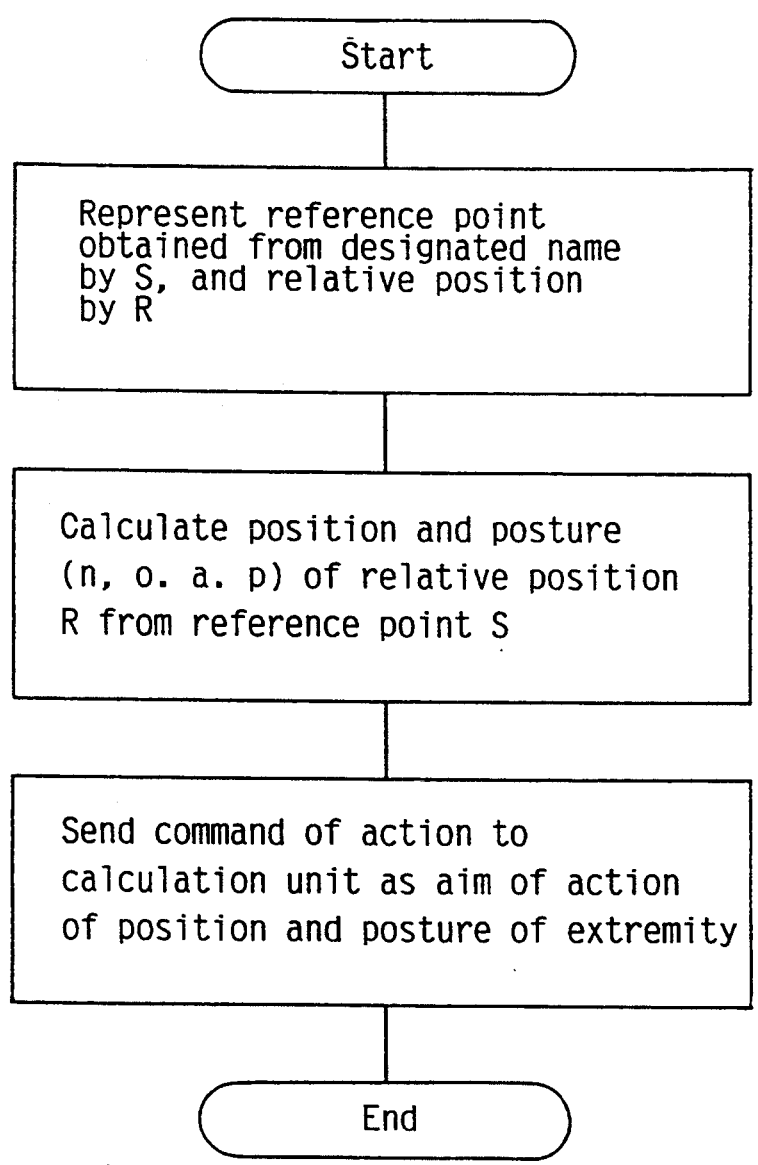
FIG. 15 is a flow chart of a process for operating the robot by appointing the reference point and the relative position.

After designation of the stored reference point and a relative position, means for calculating the aimed position of action of the robot, on the basis of these, and for operating the robot, is realized by the program of the central control unit 10. A flow chart of the processing is shown in FIG. 15. From a reference point $S=(n_s, o_s, a_s, p_s)$ and a relative position $R=(n_r, o_r, a_r, p_r)$, the aimed position and orientation (n, o, a, p) of operation for the extremity is calculated:

$$\begin{pmatrix} n & o & a & p \\ 0 & 0 & 0 & 1 \end{pmatrix} = \begin{pmatrix} n_s & o_s & a_s & p_s \\ 0 & 0 & 0 & 1 \end{pmatrix} \begin{pmatrix} n_r & o_r & a_r & p_r \\ 0 & 0 & 0 & 1 \end{pmatrix}$$

Figure 16:
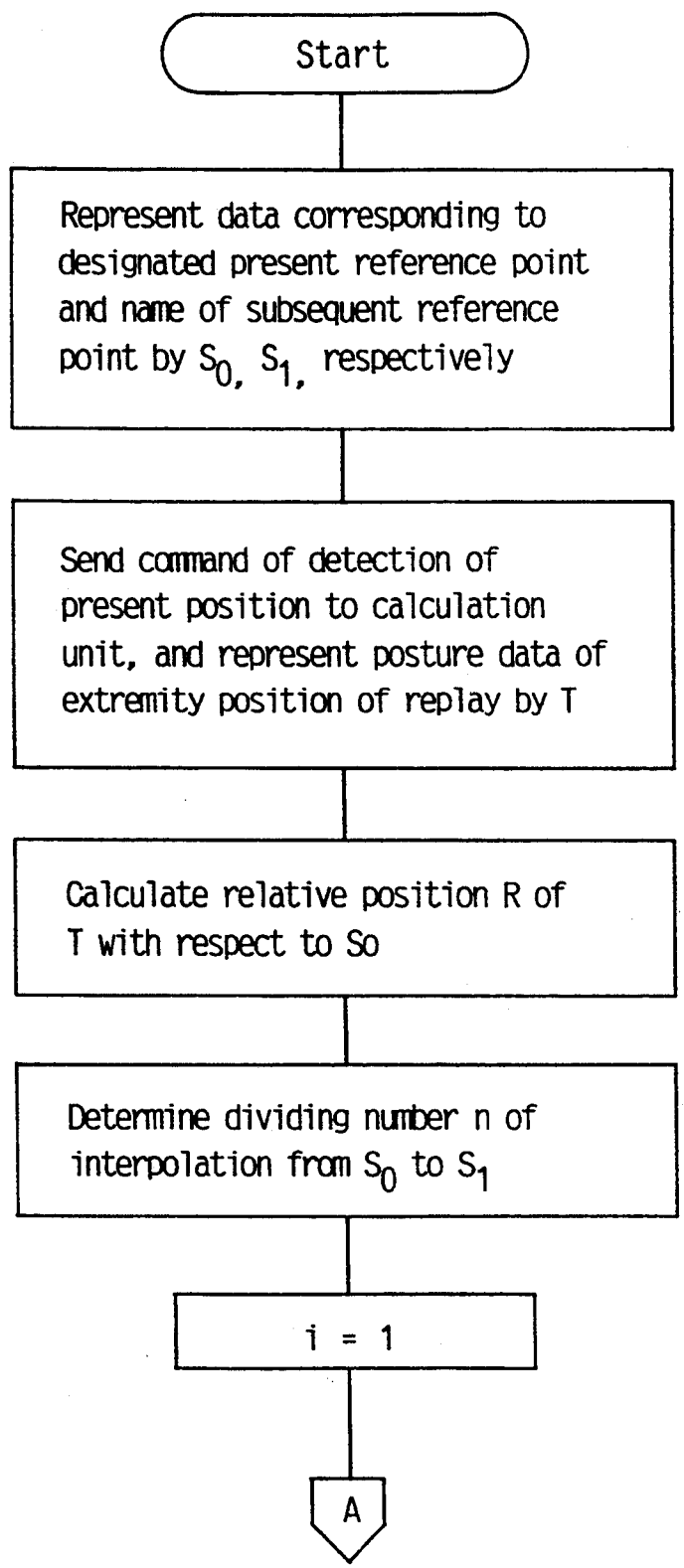
FIGS. 16 (a) and 16 (b) are flow charts of processes for operating the robot so as to move on the reference point by interpolating between the present reference point and the successive reference point during keeping the relative position of the present reference point and the robot end by designating the present reference point and the successive reference point.
Figure 16:
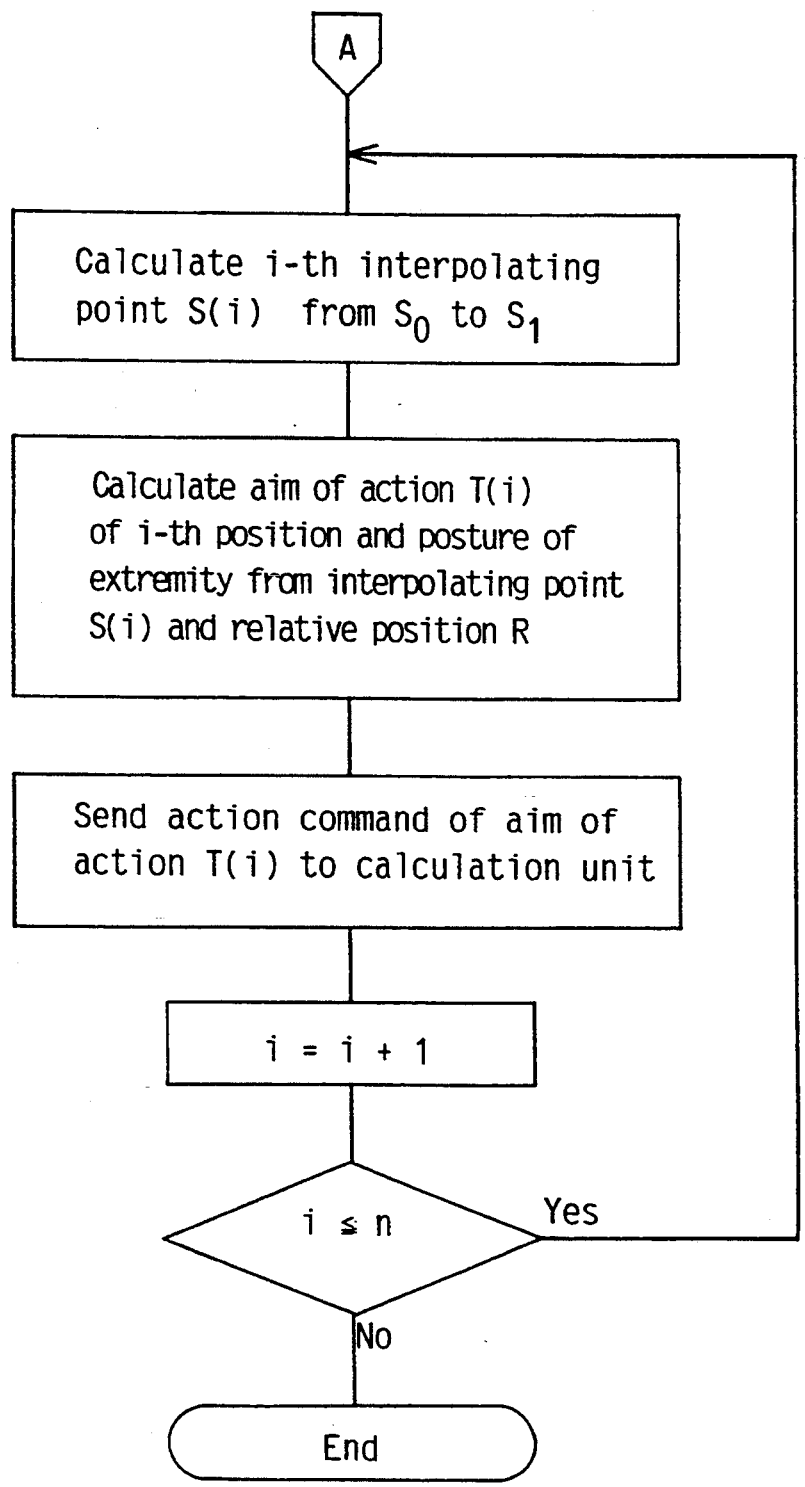
Figure 17:
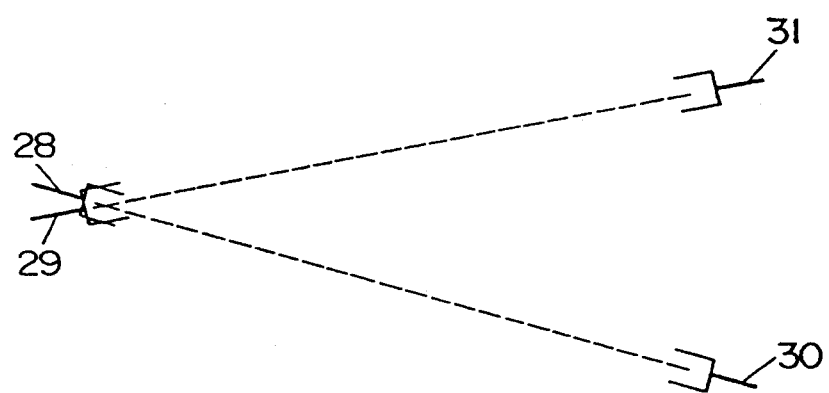
FIG. 17 is an explanatory diagram showing an example of change of gripping position of the other end due to variation of orientation of at the teaching point of gripping position in the prior art.

After designation of the present reference point and the subsequent reference point, means for operating the robot by interpolating between the present reference point and subsequent reference points while keeping the relative position of the present reference point is realized by the program of the central control unit 10. Process flow charts are shown in FIG. 16(a) and (b). A relative position $R=(n_r, o_r, a_r, p_r)$ with respect to the present reference point $S_0=(n_{so}, o_{so}, a_{so}, p_{so})$ of the position and orientation of the extremity $T=(n_t, o_t, a_t, p)$ is calculated as follows:

$$\begin{pmatrix} n_r & o_r & a_r & p_r \\ 0 & 0 & 0 & 1 \end{pmatrix} = \begin{pmatrix} n_{s0} & o_{so} & a_{so} & p_{so} \\ 0 & 0 & 0 & 1 \end{pmatrix}^{-1} \begin{pmatrix} n_t & o_t & a_t & p_t \\ 0 & 0 & 0 & 1 \end{pmatrix}$$

Further, the i-th position and orientation of the extremity $T(i)=(n_{ti}, o_{ti}, a_{ti}, p_{ti})$ is calculated from the interpolating point $S(i)=(n_{si}, o_{si}, a_{si}, p_{si})$ and relative position $R=(n_r, o_r, a_r, p_r)$ as follows:

$$\begin{pmatrix} n_{ti} & o_{ti} & a_{ti} & p_{ti} \\ 0 & 0 & 0 & 1 \end{pmatrix} = \begin{pmatrix} n_{si} & o_{si} & a_{si} & p_{si} \\ 0 & 0 & 0 & 1 \end{pmatrix} \begin{pmatrix} n_r & o_r & a_r & p_r \\ 0 & 0 & 0 & 1 \end{pmatrix}$$

In the above-mentioned respective means, in the event that two robot manipulators make performances, commands are sent to the corresponding respective calculation unit 11 or 12 in turn, and various calculation processes in the flow chart are executed responding to the two robot manipulators, respectively.

Subsequently, an action teaching method for moving one workpiece with two robot manipulators by using the above-mentioned apparatus is elucidated, as an example of a teaching method of the first invention of the present invention.

Figure 1:
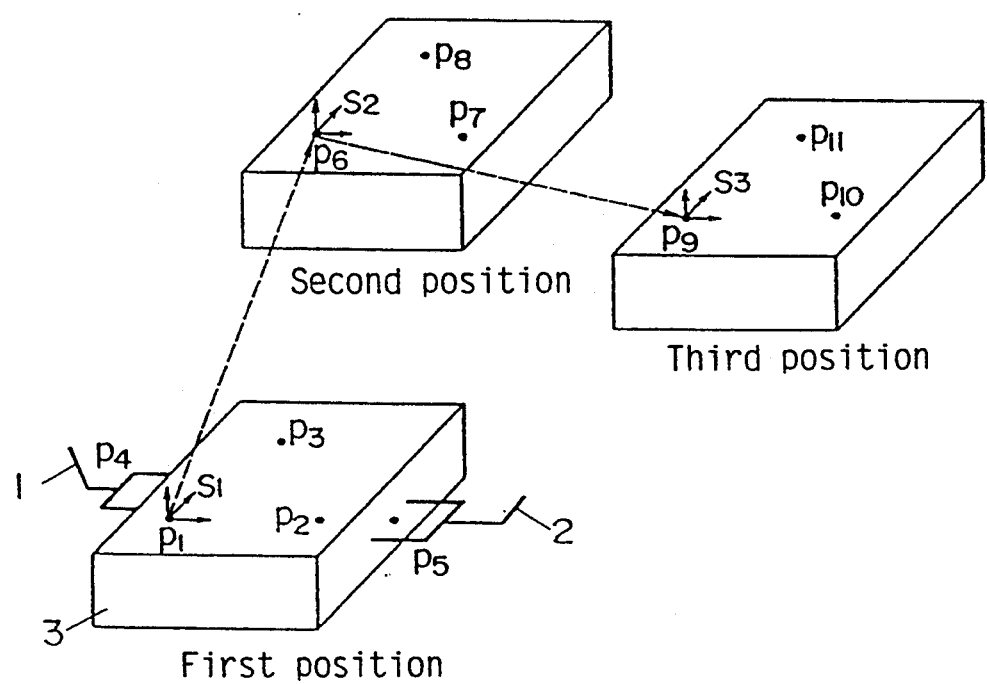
FIG. 1 is an explanatory diagram of an example of a teaching method of the present invention.
Figure 2:
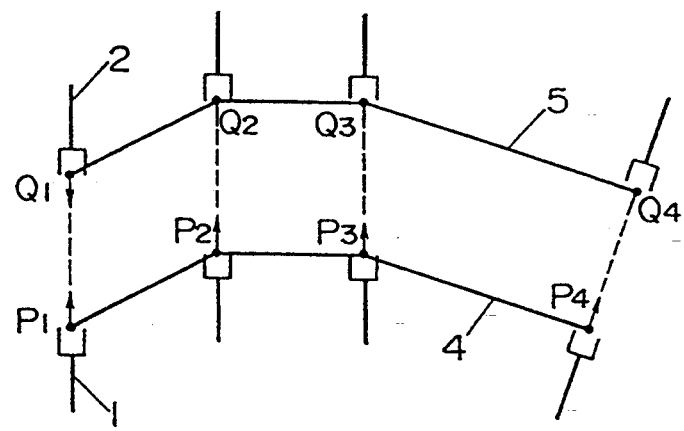
FIG. 2 is an explanatory diagram of the example of the teaching method in the prior art.

As shown in FIG. 1, moving a parallel-piped workpiece 3 from a first position to a second position, and then to a third position with two robot manipulators 1, 2 is taught as follows.

First, the workpiece 3 is placed at a first position, and the extremity of the manipulator 1 or 2 is moved to a point P1 on the workpiece 3 by operation of the keys in the teaching box 7, and the position P1 is stored by operation of the memory key of the present position. Moreover, in a similar manner, the extremity of the robot manipulator 1 or 2 is moved to another two points P2, P3 on the workpiece 3 and information about these positions is stored. Then gripping positions P4, P5 of the workpiece 3 are stored, where, P4, P5 are the gripping positions of the first robot manipulator 1 and the second robot manipulator 2, respectively, when the work 3 is placed on the first position.

Subsequently, the work is placed on the second position, and the extremity of the robot manipulator 1 or 2 is moved on three points P6, P7, P8 on the work corresponding to P1, P2, P3 by operation of the teaching box 7, and these are stored. Furthermore, the workpiece 3 is placed at the third position, with the extremity of the robot manipulator 1 or 2 being moved to three points P9, P10, P11 on the workpiece 3 corresponding to P1, P2, P3 by operation of the teaching box 7, and these are stored.

By using the means for calculating and storing the reference point from the three positions, a reference point S1 is calculated and is stored from the above-mentioned P1, P2, P3, and a reference point S2 is calculated and is stored from the above-mentioned P6, P7, P8, and a reference point S3 is calculated and is stored from the above-mentioned P9, P10, P11. Here, S1 S2, S3 are reference points representing positions and orientations of the workpiece which is placed at the first position, the second position, the third position, respectively.

From the above-mentioned S1 and P4, a relative position r1 of the gripping position of the first robot manipulator 1 with respect to the reference point is calculated and is stored, and from the above-mentioned S1 and P5, a relative position r2 of the gripping position of the second robot manipulator 2 with respect to the reference point is calculated and is stored.

Calculation of the above-mentioned reference points and their relative positions are executed by starting the program of the central control unit 10 of the control apparatus by operation of the console terminal 8.

While operating, the reference point S1 and the relative position R1 are designated and the first robot manipulator 1 is moved to the gripping position, and the reference point S1 and the relative position R2 are designated and the second robot manipulator 2 is moved to the gripping position. Then, the present reference point and the subsequent reference point are designated, and while keeping a relative position of the present reference point and the extremity of each robot by operating each robot so as to move by interpolating between the present reference point and the subsequent reference point, the work can be moved from the first position to the third position via the second position by letting the robot manipulator 1 or 2 make action for designating S1 for the present reference point and for designating S2 for the subsequent reference point and make for designating S2 for the present reference point and for designating S3 for the subsequent reference point to the robot manipulator 1 or 2.

INDUSTRIAL APPLICABILITY

As seen from the above action teaching method and control apparatus for a robot, since an actual work position is taught from an operational position of the robot manipulator, default on an accuracy of operational position due to difference of numeral input data and actual operational circumference which is liable to occur in off-line teaching is eliminated. Moreover, since the operational position of the robot manipulator is taught by separating a reference point, which is a position and orientation representing the work, and a relative position with respect to the reference point of the gripping position of each robot manipulator, in the event that the moving position of the work is varied, only the reference point which is varied is taught again, and in the event that the gripping position is varied, only the relative position is taught again. Additionally, since the moving path of the work is designated by reference points, action teaching by keeping the relative position of plural robot manipulators is not needed. Furthermore, the method of the present invention is easily applicable to the various number of the robot manipulator. Moreover, in the second invention of the present invention, since teaching of reference points is calculated from plural teaching positions, it is not needed to take care of the orientation of the extremity of the robot manipulator in teaching.

As mentioned above, in the action teaching method and the control apparatus of the robot of the present invention, the teaching can be executed in a way of thinking based on the work, and particularly in the action teaching of plural robot manipulators, accurate and easy teaching is made possible.

We claim:

1. An action teaching method for a robot system having a plurality of moveable robot-manipulator adapted to hold a workpiece, comprising the steps of:
    manually operating one of said robot-manipulators to said workpiece while at a first area, and determining a first reference point indicative of a relative position and orientation of said workpiece at said first area;
    manually operating said robot-manipulators to said work piece while at said first area and determining gripping positions where said plurality of robot-manipulators hold said workpiece while at said first area;
    manually operating said one of said robot-manipulators to said workpiece while at a second area and determining a second reference point indicative of a relative position and orientation of said workpiece at said second area;
    designating a path of operating positions for said plurality of robot-manipulators by interpolating between arrays respectively having data representing the first and second reference points; and
    determining relative gripping positions where said plurality of robot-manipulators hold said workpiece while not at said first area, said relative gripping positions being distinct from said reference points and maintained in a relative position to said reference points while said workpiece is being moved.

2. A method as in claim 1, wherein said each of said first and second reference point is determined by moving said one of said robot-manipulators to at least three positions within said first and second area, respectively, so as to indicate said relative position and orientation of said workpiece.

3. A method as in claim 2, wherein a first of said positions is used to represent said position of said workpiece and a second and third of said positions are used to represent said orientation of said workpiece.

4. A method as in claim 1 wherein each of said robot-manipulators respectively grip different portions of the workpiece, and are commanded to different locations relative to said reference point, where each of said robot-manipulators grip the workpiece at a different location relative to a single reference point.

5. A method as in claim 1 wherein said manually operating steps each include the steps of moving said one of said robot-manipulators to at least two points on the workpiece and storing information about these two points to obtain position and orientation.

6. A method as in claim 1 wherein said manually operating steps each include moving said one of said robot-manipulators to three points on the workpiece at each of said first and second areas, and measuring three dimensional information including position, and two dimensional orientation, from said three points.

7. A control apparatus for a robot system having a plurality of robot-manipulators, comprising:
    means for manually operating the robot system,
    means for detecting and storing a plurality of positions and orientations of one of said plurality of robot-manipulators while at different locations,
    means for calculating and storing a reference point from said plurality of stored positions and orientations;
    means for calculating and storing relative states of said plurality of robot-manipulators, indicative of their position and orientation, on the basis of said reference point;
    control means, responsive to said stored reference point and relative states, for calculating a desired path of operation over which said robot system is to be operated, and for designating a present reference point as a starting point and a subsequent reference point as an ending point, and
    means for controlling said plurality of robot-manipulators so as to hold a workpiece at said starting point by specifying gripping positions relative to said present reference point, and for moving said robot system so as to move between reference points by interpolating between the present reference point and the subsequent reference point, while keeping a relative position between the present reference point and said plurality of robot-manipulators by moving said robot system in a manner so as to maintain an original orientation of said workpiece.

8. A control apparatus of a robot system in accordance with claim 7, wherein the means for calculating and storing a reference point from said plurality of stored positions and orientations includes calculating said reference point from three positions, wherein a first position of said three positions represents the position of the reference point and the other positions represent orientation of the reference point.

9. A control apparatus of a robot system in accordance with claim 7, wherein the means for calculating and storing a reference point from said plurality of stored positions and orientations includes calculating a the reference point from two positions, a first position of said two positions representing the position of the reference point and the other position representing orientation of the reference point.

10. A control apparatus according to claim 7 wherein each of said robot-manipulators holds a side of said workpiece, said control means designating positions of said respective robot-manipulators relative to said reference point.

11. A controllable robot apparatus comprising:
at least two robot-manipulators;
means for manually operating said robot-manipulators;
means for setting a holding position where said robot-manipulators hold a workpiece;
means for detecting and storing a present position and orientation of of each of said robot-manipulators;
means for calculating and storing one of the present position or a relative position with respect to the present position and orientation of one of said robot-manipulators by determining the stored position and orientation as a reference point and for designating the reference point and the relative position, and calculating a desired position of operation of the robot apparatus on the basis of stored information and for operating the robot apparatus, and
means for designating a present reference point and a subsequent reference point, and operating the robot apparatus so as to move between the reference points by interpolating between the present reference point and the subsequent reference point, the movement of said robot apparatus proceeding in a manner so as to maintain an original orientation of said workpiece, allowing for a relative position of the present reference point and each of said robot-manipulators to be maintained so that said robot-manipulators hold the workpiece at the holding position and the reference point stays at its proper position on an interpolated path.

12. A control apparatus according to claim 11 wherein each of said robot-manipulators holds a side of said workpiece, said control means designating positions of said respective robot-manipulators relative to said reference point.

13. A method of operating a robot system possessing a plurality of robot-manipulators, comprising the steps of:
establishing a path from a first position to a second position;
manually moving one of said robot-manipulators to a first area in said first position and moving said one of said robot-manipulators to at least two points within said first area;
calculating a first reference point from said at least two points, said first reference point including at least position information and orientation information;
manually moving said one of said robot-manipulators to a second position and locating said one of said robot-manipulators to at least two points in a second area of said second position and determining position information including position and orientation of said second area from said at least two points to determine a reference point of said second position; and
interpolating a path between said first reference point and said second reference point;
determining positions where said plurality of robot-manipulators hold said workpiece relative to said reference point; and
setting positions of said plurality of robot-manipulators along said path that maintain an original orientation of said workpiece, allowing for a relative position of said robot-manipulators and said reference point to be maintained along said path.

14. A control apparatus according to claim 13 wherein each of said robot-manipulators holds a side of said workpiece, said control means designating positions of said respective robot-manipulators relative to said reference point.

* * * * *